Patented Oct. 12, 1954

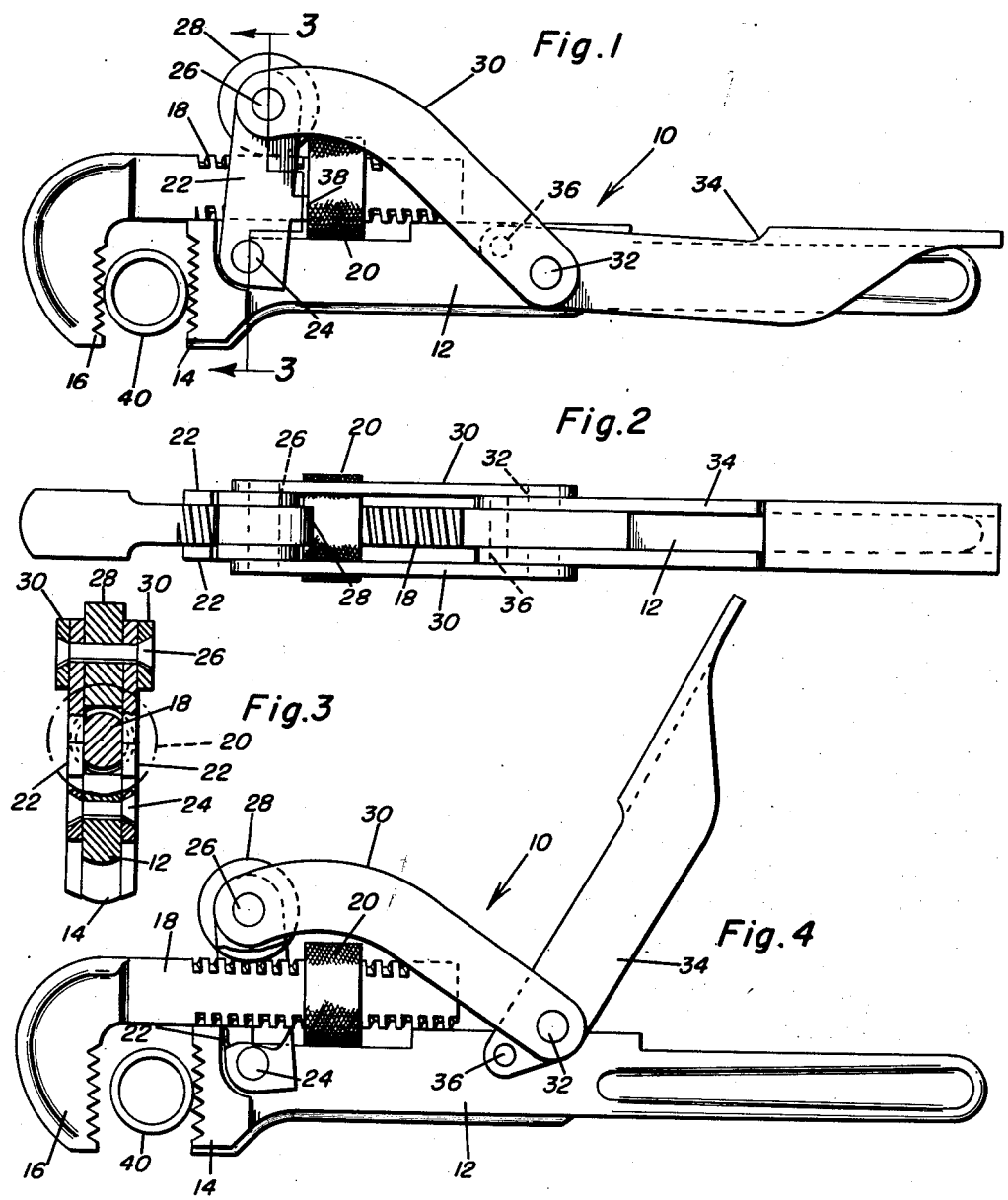

2,691,317

UNITED STATES PATENT OFFICE 2,691,317

LOCKING DEVICE FOR PIPE WRENCHES

Ernest T. Olson, Oshkosh, Nebr.

Application December 7, 1953, Serial No. 396,463

3 Claims. (Cl. 81—88)

This invention relates to new and useful improvements and structural refinements in pipe wrenches, and the principal object of the invention is to prevent such wrenches from slipping when they are applied to the work.

The above object is achieved by the provision of a locking device which sustains the movable jaw of the pipe wrench in a predetermined, adjusted position with respect to the stationary jaw, and thereby assures that proper grip of the work is attained.

Some of the advantages of the invention reside in its simplicity of construction, in its efficient and dependable operation and in its adaptability to economical manufacture.

These together with other objects and advantages which will become subsequently apparent reside in the details of construction and operation as more fully hereinafter described and claimed, reference being had to the accompanying drawings forming a part hereof, wherein like numerals refer to like parts throughout, and in which:

Figure 1 is a side elevational view of the invention;

Figure 2 is a top plan view thereof;

Figure 3 is a sectional detail taken substantially on the plane of the line 3—3 in Figure 1, and Figure 4 is a side elevational view, similar to that shown in Figure 1, but illustrating the invention in its released or open position.

Referring now to the accompanying drawings in detail, the pipe wrench is designated generally by the reference character 10 and embodies in its construction the customary elongated handle 12 provided with the stationary jaw 14, while a coacting movable jaw 16 is provided on a threaded shank 18 carrying the customary, rotatable nut 20.

As will be readily apparent, the shank 18 is slidable longitudinally with respect to the handle 12 upon rotation of the nut 20, and the invention resides primarily in the provision of a link assembly 22 which is pivotally attached to the handle 12 adjacent the stationary jaw 14 by a transverse pin or rivet 24.

The link assembly 22 straddles the shank 18 and is provided at its outer end with the transverse pin 26 on which is journalled a roller 28, the latter being engageable with the back surface of the shank 18, as shown in Figures 1 and 4.

An arm assembly 30 is pivotally connected to the link assembly 22 by the pin 26 which carries the roller 28, and the arm assembly 30 is operatively connected by rivets 32, or the like, to a locking lever 34 which, in turn, is pivoted to the handle 12 by a transverse pin 36.

Finally, it will be observed that the link assembly 22 is provided with a pair of abutments, one of which is illustrated at 38 in Figure 1, these abutments being so arranged that they are engageable with the actuating nut 20. The arm assembly 30 is preferably of an arcuate configuration so that it affords a recess or space to accommodate the nut 20 and thereby prevents the nut from being displaced relative to the handle 12, as is clearly shown in Figures 1 and 4.

When the device is in its open position, as shown in Figure 4, the nut 20 may be rotated so as to adjust the distance of the movable jaw 16 with respect to the stationary jaw 14. However, when the necessary adjustment has been made, the actuating lever 34 is simply swung toward the handle 12 as shown in Figure 1, whereby the arm assembly 30 causes the link assembly 22 to press the roller 28 against the back of the shank 18 and in frictional contact with the handle 12. Simultaneously, the abutments 38 of the link assembly 22 will engage the nut 20 as shown in Figure 1, so that the nut will be prevented from rotating and the shank 18 will be prevented from sliding. It will be apparent that in this manner the jaws 14, 16 will firmly grip the work 40 such as may be disposed therebetween, so as to safeguard against any possibility of the wrench slipping.

From the foregoing, the construction and operation of the device will be readily understood and further explanation is believed to be unnecessary. However, since numerous modifications and changes will readily occur to those skilled in the art, it is not desired to limit the invention to the exact construction shown and described, and accordingly, all suitable modifications and equivalents may be resorted to, falling within the scope of the appended claims.

What is claimed as new is as follows:

1. In a pipe wrench, the combination of a handle provided with a stationary jaw, a threaded shank slidable longitudinally relative to said handle and provided with a coacting jaw movable toward and away from said stationary jaw, an actuating nut provided on said threaded shank and operatively connected to said handle whereby the shank may be slid by rotation of said nut, and a locking device for said shank, said locking device comprising a link assembly pivoted to said handle and straddling said shank, a roller carried by said link assembly and operatively engaging said shank whereby to press the latter against said handle, a locking lever pivoted to the handle, and an arm assembly operatively connecting said lever to said link assembly.

2. The device as defined in claim 1 together with abutment means provided on said link assembly and engageable with said nut, whereby to resist rotation of the latter.

3. The device as defined in claim 1 wherein said arm assembly is arcuated and affords means for frictionally holding said nut adjacent said handle.

References Cited in the file of this patent

UNITED STATES PATENTS

| Number | Name | Date |
|---|---|---|
| 884,422 | Schmitt | Apr. 14, 1908 |
| 1,309,874 | Arnot | July 15, 1919 |
| 1,503,662 | Norton | Aug. 5, 1924 |
| 1,747,360 | Giles | Feb. 18, 1930 |
| 1,811,452 | Blalock | June 23, 1931 |
| 2,524,376 | Clark | Oct. 3, 1950 |
| 2,657,606 | Finn | Nov. 3, 1953 |